US006819388B2

(12) United States Patent
Battersby

(10) Patent No.: US 6,819,388 B2
(45) Date of Patent: Nov. 16, 2004

(54) ACTIVE MATRIX LIQUID CRYSTAL DISPLAY WITH LOCAL DRIVERS

(75) Inventor: Stephen J. Battersby, Haywards Heath (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1 day.

(21) Appl. No.: 10/206,309

(22) Filed: Jul. 26, 2002

(65) Prior Publication Data

US 2003/0035080 A1 Feb. 20, 2003

(30) Foreign Application Priority Data

Aug. 17, 2001 (GB) .............................................. 0120110

(51) Int. Cl.⁷ .......................................... G02F 1/1345
(52) U.S. Cl. .................................................... 349/151
(58) Field of Search ..................... 349/151, 45; 345/98, 345/103, 100; 430/30

(56) References Cited

U.S. PATENT DOCUMENTS

| 5,336,879 A | | 8/1994 | Sauer ....................... 250/208.1 |
| 5,434,433 A | * | 7/1995 | Takasu et al. ................. 257/59 |
| 5,827,755 A | * | 10/1998 | Yonehara et al. ............. 438/30 |
| 5,926,158 A | | 7/1999 | Yoneda et al. ................ 345/90 |
| 6,022,751 A | * | 2/2000 | Shindo et al. ................ 438/21 |

* cited by examiner

Primary Examiner—Kenneth Parker

(57) ABSTRACT

The invention relates to an active matrix liquid crystal display, and in particular to an active matrix plate incorporating driver circuits (3) for the row (13) and column (9) electrodes. The driver circuits (3) are arranged on substrate (1) underneath the row (13) and column electrodes (9) and connected to the row and column electrodes (9,13) through vias (33). Reflective pixel electrodes (21) are provided. The driver circuits (3) are distributed, preferably in a two dimensional array, so that each of the row and/or column electrodes is connected to a driver circuit (3).

10 Claims, 4 Drawing Sheets

ACTIVE MATRIX LIQUID CRYSTAL DISPLAY WITH LOCAL DRIVERS

The invention relates to an active matrix liquid crystal display, and in particular to an active matrix liquid crystal display incorporating driver circuits for the row and column electrodes.

Active matrix liquid crystal displays are well known. In such displays, an active plate and a passage plate sandwich a liquid crystal. The active plate includes a number of electrodes for applying electric fields to the liquid crystal; the electrodes are generally arranged in an array. Row and column electrodes extending along the rows and columns of pixel electrodes connect and drive thin film transistors which drive respective pixel electrodes.

The row and column electrodes are driven to control the thin film transistors to control the charge stored on corresponding pixel electrodes. Each pixel may also include a capacitor for maintaining charge on the pixel.

One difficulty is in providing the necessary circuits for decoding incoming signals and driving the row and column electrodes. Generally, such drive circuits are arranged around the outside the pixel array.

Some designs of active matrix display include one or more circuit elements in addition to the thin film transistor associated with each individual pixel within the array. For example, U.S. Pat. No. 5,926,158 has a pixel capacitor, memory cell, and a switch associated with each pixel. These circuit elements are formed at the level of the thin film transistor.

However, although providing such additional circuitry associated with each pixel alters somewhat the requirement for driver circuitry, there remains the need for row and column drivers and the need to provide space for them.

There is a need for an improved arrangement to reduce the area taken up by the row and column drivers of an active matrix display.

According to the invention there is provided an active plate for an active matrix liquid crystal display, including a substrate; an array of pixels, each pixel having a pixel electrode for controlling liquid crystal; a plurality of row electrodes and column electrodes extending across the substrate in substantially orthogonal row and column directions connected to the pixels; a sub-array of driver cells extending across the substrate between the array of pixels and the substrate, the driver cells each including at least one driver circuit for driving a row electrode or a column electrode; and an insulating layer between the sub-array of driver cells and the array of pixels; wherein each of the driver circuits in the sub-array is connected to a corresponding one of the row and column electrodes through a respective via defined in the insulating layer extending from the driver circuit to the corresponding one of the row and column electrodes.

Thus, in the invention the driver circuits are arranged in an array under the pixel array, and connected to the row or column electrodes of the pixel array by vias. In this way, the amount of space required for the row and driver circuits around the edge of the array may be substantially reduced from that required in conventional arrangements.

Further, the arrangement according to the invention greatly eases connection between the driver circuits and the row and column electrodes.

It will be noted that since the number of driver circuits required equals the number of row electrodes, or column electrodes, or both, this is much less than the number of pixel elements which is the product of the number of rows and the number of columns. Accordingly, the driver circuits can be significantly larger in size than the individual pixel elements, so that the circuits can readily be implemented using available lithography resolution.

Preferably, the vias are distributed over substantially the whole of the area of the array, rather than being arranged in a particular location, for example around the outside of the array. In this way, in particularly preferred embodiments, the row or column electrodes are connected directly to the driver circuits through the vias without the use of any lateral interconnections in the sub-array of driver cells.

Embodiments of the invention may provide further processing elements on the same level of the sub-array of driver cells. In particular, such further elements may include a memory, for example for use as a frame store to allow the display to run in low power mode when not displaying high quality images.

It will be appreciated that in embodiments of the invention the sub-array can include all the row drivers, all the column drivers, or both. Row or column drivers not provided under the pixel array may be provided around the edge of the pixel array. In this way, the area of the substrate required for driver and driver circuits can be reduced from arrangements requiring both row and column drivers to be arranged around the outside of the pixel array.

An edge sealant may be provided to seal the cell, rather than the more normal sealant that extends into the bulk of the glass by about 1.5 mm.

The invention also relates to a liquid crystal display including an active plate as set out above. The invention allows the pixel elements to extend right to the edge of the substrate of which the active plate of the display is provided.

The invention also relates to a reflective liquid crystal display comprising an array of active plates as described above arranged in a plane, the substrates of the active plates extending in the plane of the array; at least one passive plate spaced transversely away from the two dimensional array; and liquid crystal between the active and passive plates.

The invention also relates to a method of making an active plate for a liquid crystal display including: defining a sub-array of driver cells across a substrate, the driver cells each including at least one driver for driving a row and/or a column electrode; depositing an insulating layer on the sub-array of driver circuits; defining a pattern of vias passing through the insulating layer, the vias being distributed over the sub-array of driver circuits; defining an array of pixels over the insulating layer, the array of pixels including a plurality of row electrodes and column electrodes extending across the substrate in substantially orthogonal row and column directions connected to the pixels; wherein each of the driver circuits in the sub-array is connected to a corresponding one of the row and column electrodes through the respective via defined in the insulating layer.

For a better understanding of the invention, embodiments will now be described, purely by way of example, with reference to the accompanying drawings in which.

It should be noted that none of the Figures are to scale. Like or corresponding components are generally given the same reference numeral in different Figures.

Figure 2:
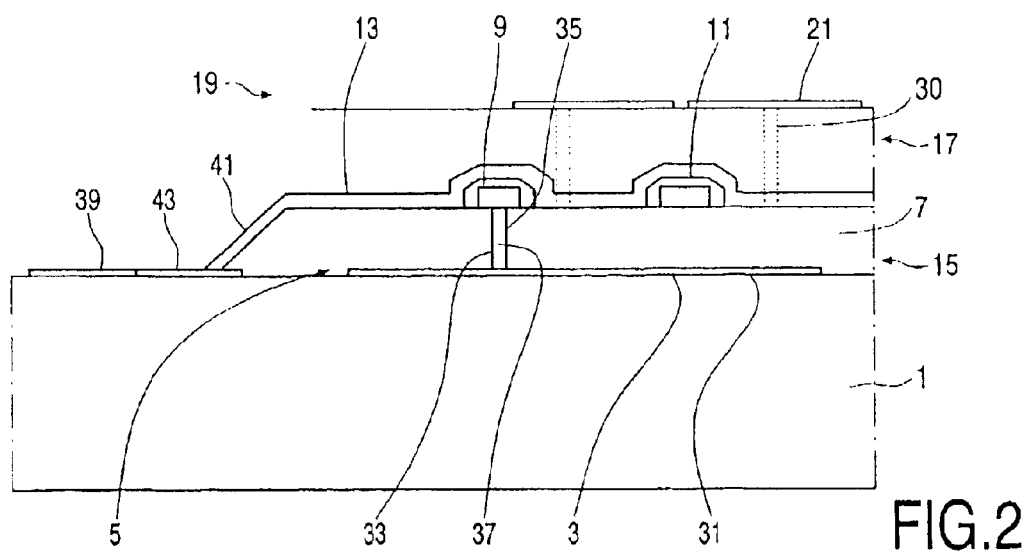
FIG. 2 shows a section along A—A through the active plate shown in FIG. 1.
Figure 3:
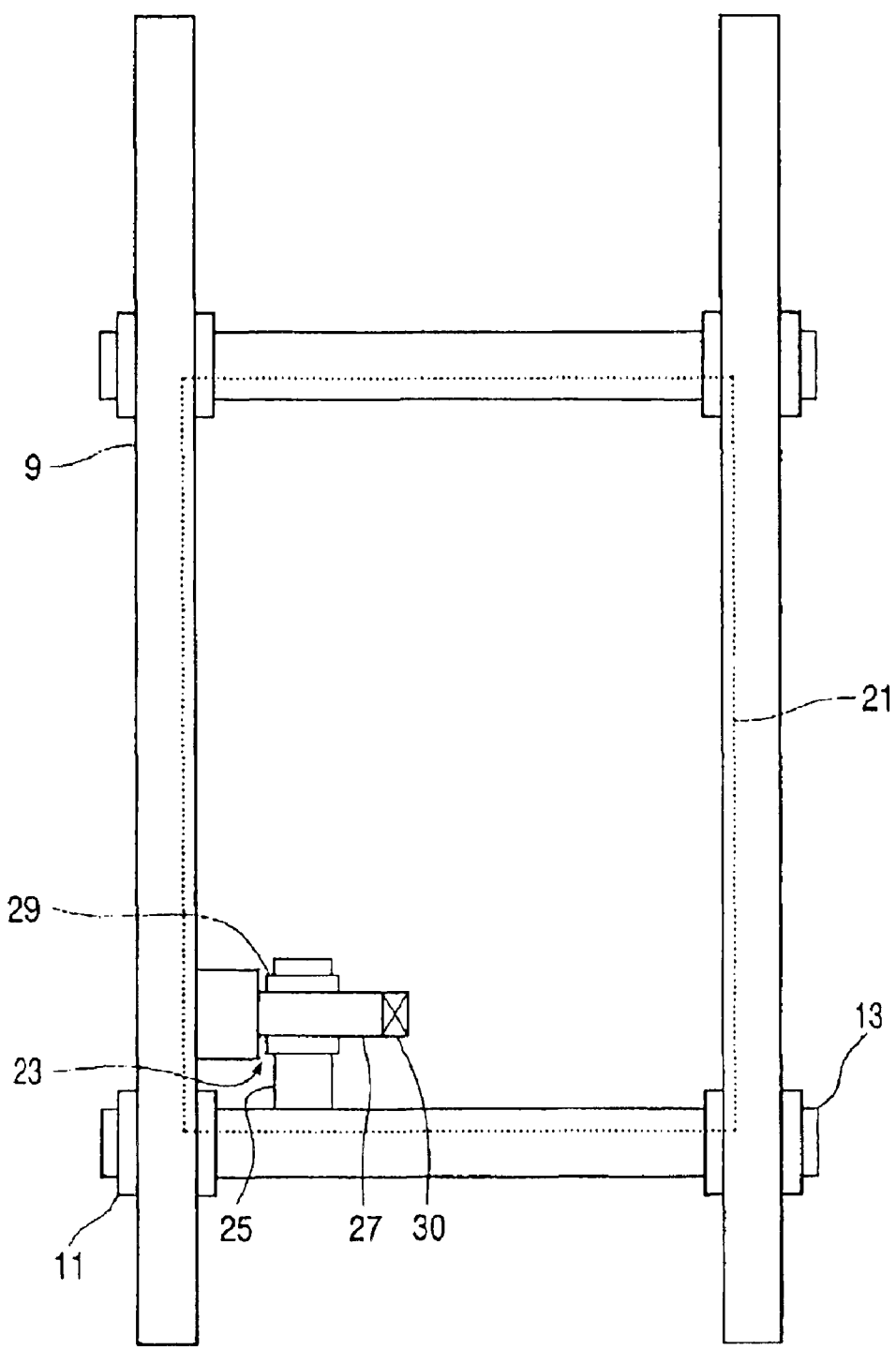
FIG. 3 shows a single pixel of the active plate of FIG. 1 in greater detail.

An active plate according to a first embodiment of the invention will be described with reference to FIGS. 1 to 3.

The structure is formed on a substrate 1, which may be formed of any convenient material. The structure can be divided into two layers, a lower driver layer 15 which includes drive electronics and an upper pixel layer 17 which includes the pixels 20 and the thin film transistors 23 included with each pixel in an active matrix structure. An insulating layer 7 separates the driver layer 15 from the pixel layer 17.

The pixel layer 17 includes row electrodes 13 extending across the substrate substantially parallel to one another and column electrodes 9 extending across the substrate substantially orthogonally to the row electrodes 13. Insulating spacers 11 are provided where the row and column electrodes cross to insulate the row electrodes 13 from the column electrodes 9.

The row and column electrodes 9, 13 form an array 19 of pixels 20, with one pixel 20 being provided for each intersection of the row and column electrodes. Each pixel has a reflective pixel electrode 21 driven by a thin-film transistor 23, connected by via 30.

The structure is accordingly a reflective structure, in which incident light is reflected off the pixel electrodes. This avoids any problems that might be experienced in using the invention in a transmissive arrangement, in which light would have to pass through the display and accordingly would have to pass through not merely the pixel layer 17 but also through the driver layer 15.

As can be seen, the pixel electrodes 21 cover substantially the whole of the top layer of each pixel, overlapping the row and column electrodes 9,13 and the thin film transistor 23, to maximise the reflective surface and hence the brightness of the ultimate display.

The transistor 23 is formed from a gate 25 extending laterally from the corresponding row electrode 13. A semiconductor layer 27 connects the corresponding column electrode 9 to the pixel electrode 21. The gate 25 is insulated from the semiconductor layer 27 by a gate dielectric 29 for example SiN.

The thin film transistor shown is a bottom-gated structure but alternative bottom gated structures or top-gated structures may also be used if required.

Figure 1:
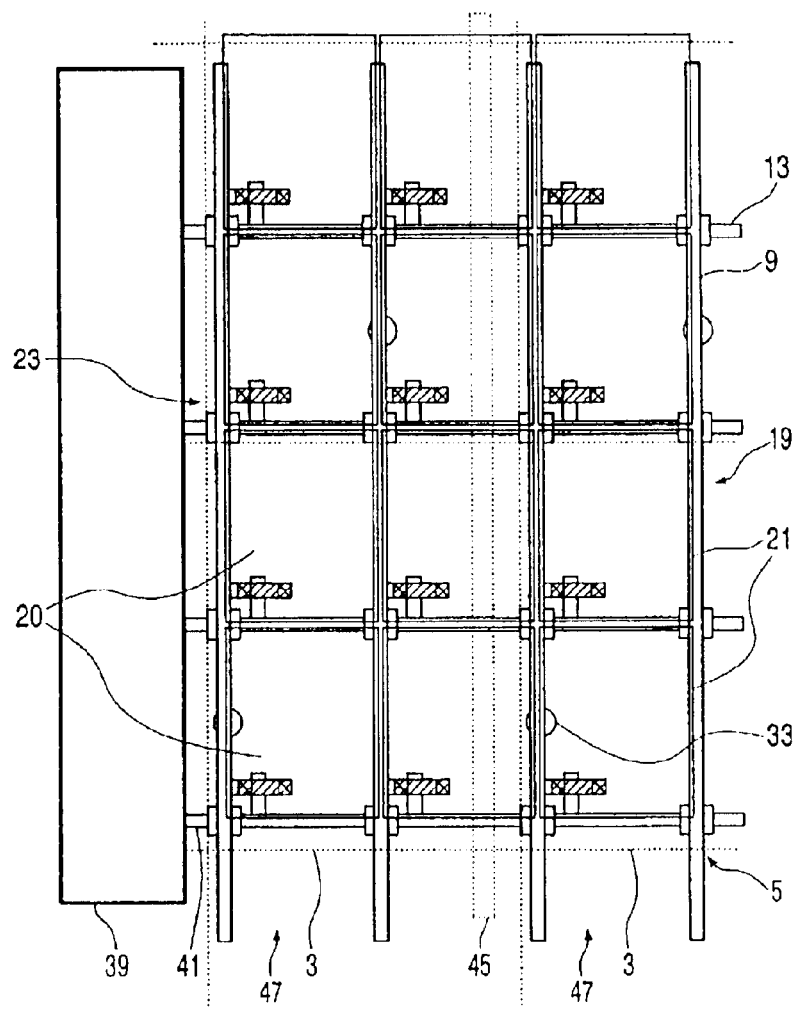
FIG. 1 shows a top view of the active plate according to the invention.

The dotted lines in FIG. 1 show the individual driver cells 3 of the driver cell sub-array 5 on the lower, driver layer of the active plate. As can be seen, each driver cell 3 underlies a number of pixels. For clarity, each driver cell 3 is shown as underlying only four pixels but it will be appreciated that in practice the number may be much larger than this.

The driver cells 3 include electronic circuits that may be formed by any convenient method. For example, the substrate 1 may be a conventional single crystal semiconductor substrate and the electronic circuits formed by conventional crystalline semiconductor techniques. Alternatively, the circuits may be formed as thin films over the substrate, which may then be glass, semiconductor or indeed any suitable support material.

In the illustrated embodiment the driver cells 3 each include a single column driver 31 for driving a corresponding column electrode 9 of the pixel array 19. The column drivers 31 are connected to the corresponding column electrode 9 through corresponding conductive vias 33. The conductive vias 33 are formed as via holes 35 defined in the insulating layer 7. The via holes 35 are distributed over the area of the array 19 so that each column electrode 9 is connected through a single respective via 33 to a single corresponding column driver 31. Metallisation 37 fills the via holes 35. Row drivers 39 are arranged outside the area of the pixel array 19, and connected to corresponding row electrodes 13 by interconnects 41 connected to a driver pad 43 on each row driver 39. A data bus 45 is arranged to pass through each driver cell 3.

The active plate can be manufactured by patterning and forming the sub-array 5 of driver cells 3 on the substrate 1 in a known manner. Then, an insulating layer 7 can be deposited, and the pattern of vias 33 formed.

The pixel layer 17 can then be formed over the insulating layer 7 in a like manner to the conventional formation of a reflective pixel active plate on a substrate. The only particular requirement is that the rows and column electrodes 9,13 need to be aligned with the vias 33. It should be noted that the vertical scale of FIG. 2 is exaggerated and so the aspect ratio of the via is not as large as illustrated in FIG. 2, so that the metallisation deposited to form the row and column electrodes 9,13 also fills the vias 33 to form the interconnection metallisation 37.

As illustrated, row drivers 39 take up a substantial amount of space when placed at one side of the array, and the column drivers would take up even more than this. Thus, by arranging the row drivers, the column drivers or both under the array in the arrangement according to the present invention, the area required for the margin of the display can be substantially reduced.

The present invention thus eases the problem of interconnecting the driver cells 3 to the column electrodes 9, whilst reducing the area around the array required for driver electronics.

The driver cells 3 of the invention are distributed in a regular sub-array 5 extending in the row and column directions parallel to the row and column conductors respectively. This also assists in packing in the driver cells 3 in the available space below the pixel array 19. A number of column electrodes 9 are arranged above each column of driver cells. In FIG. 1, two column electrodes 9 are shown above the first column 47 of driver cells. In practice there will be more. Each column electrode 13 above the first column 47 of cells is connected to one of the driver cells 3 by a via 33.

In an arrangement according to the invention the cells can be made and distributed in any of a large number of ways. However, it is of interest to minimise the number of cells consistent with driving the column electrodes, because this maximises the area of each driver cell which eases the design of the driver cells.

Figure 4:
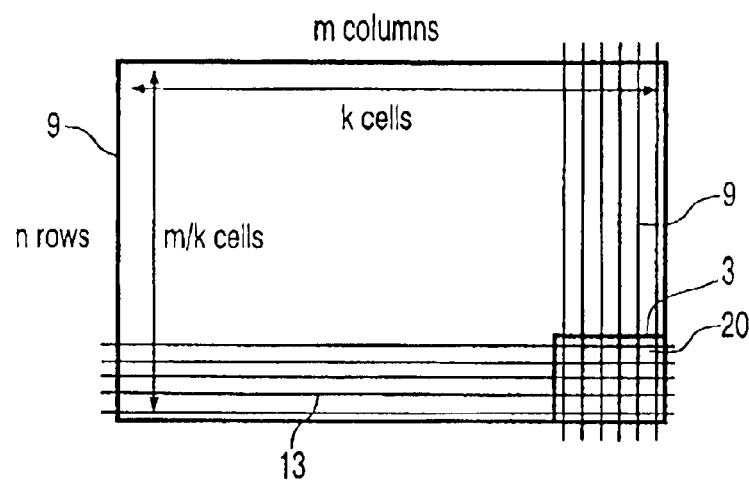
FIG. 4 illustrates an array of n pixels by m pixels.

Consider the example (FIG. 4) of a pixel array 19 having m columns and n rows of pixels 20, and let there be k driver cells 3 across the array, in the row direction. Therefore, each driver cell lies under m/k different column electrodes 9, and so there need to be m/k driver cells in each column so that each cell can drive one column. There are thus m driver cells 3 in all.

Since the number of cells in each row and column must all be integers, m, n, k, m/k and nk/m must all be integers. For example if m=10000, n=5000, n/m=½ and so suitable values of k are 20, 50, 100, 200.

Embodiments of the invention may also use a square array 17 and sub-array 5. That is n=m, k=4 √m. For a square array, the maths is rather neater. For a m×m array, there are √m cells both horizontally and vertically in the sub-array, yielding m cells altogether, each of which must contain one column driver and one row driver to address the whole array.

Figure 5:
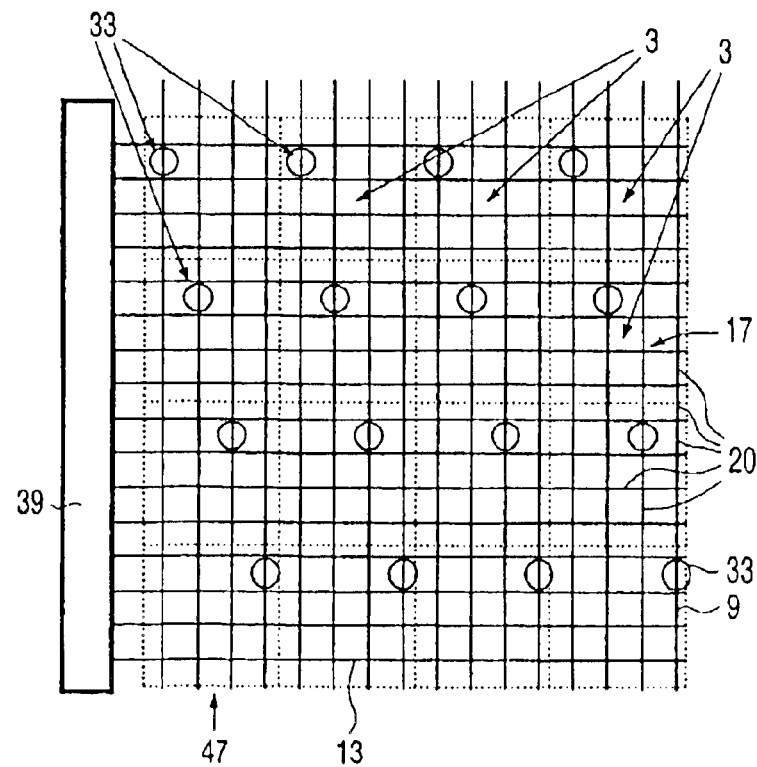
FIG. 5 shows the pattern of vias for a 16 by 16 pixel array.

The interconnection between the overlying pixel array and the column driver sub-array is illustrated schematically in FIG. 5 for a square array of 16×16 rows and columns. The row drivers 39 are located to one side of the array and at a different level from the pixel array 17. The small circles represent vias 33 made in a dielectric layer which separates the driver sub-array from the pixel array and allows the two to be electrically connected. (A rectangular array can also be chosen but, for reasons outlined above, a square array is especially straightforward.).

Figure 6:
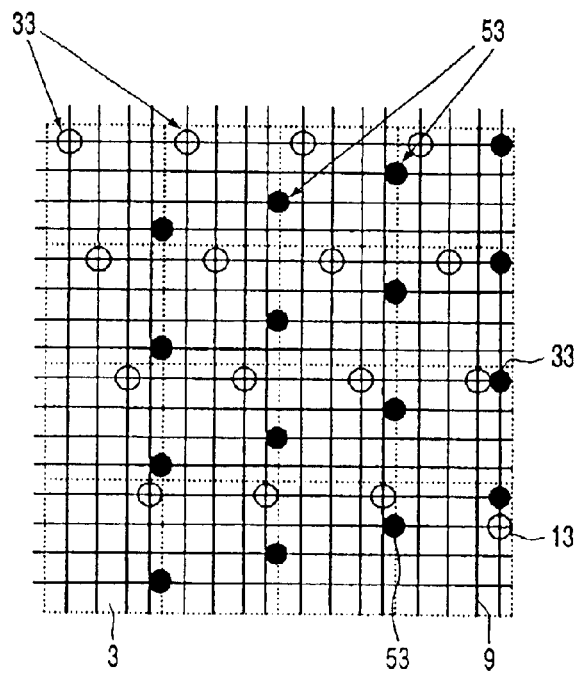
FIG. 6 illustrates an alternative pattern of vias for a 16 by 12 pixel array in an alternative embodiment having row and column drivers in the driver cells.

The description above refers to a minimum of m driver cells 3 each of which contains one column driver 31. It is also possible to connect the row electrodes 9 of the pixel array 19 to row drivers 39 in the driver cells 3 as using vias 53, as illustrated in FIG. 6. For an m×n array, only n row drivers 39 are required (n is assumed to be less than m) so m driver cells 3 are more than sufficient to accommodate the n row drivers 39. Indeed, each horizontal row of cells in the sub-array has k cells 3 but only nk/m<k rows to drive. With sufficient cells including row drivers to drive these nk/m rows, the space on the remaining k(1−n/m) cells 3 could therefore be used for other purposes.

In this example, each driver cell 3 contains both a row and a column driver and there must be two connections to the pixel array 19 per driver cell 3. It will be appreciated that other arrangements are possible. For example, not all driver cells 3 may include row drivers 39 or alternatively the row drivers 39 may be arranged in different cells to the column drivers 31.

Figure 7:
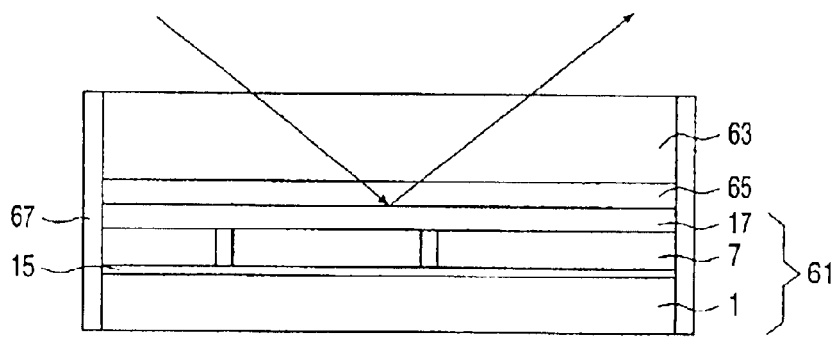
FIG. 7 shows a side view of liquid crystal display according to the invention.

FIG. 7 illustrates a complete liquid crystal display in which an active plate 61 is formed of substrate 1, driver layer 15, insulator 7 and pixel layer 17 as previously described. A passive plate 63 is opposed to the active plate and liquid crystal 65 is sandwiched between. An edge sealant 67 is provided at the edge of the liquid crystal to seal the various parts together.

The display works by reflected light. This avoids any difficulty with the electronics in the driver layer interfering with the passage of light through the device.

The invention makes it possible for the array of pixels to extend right to the edge of the substrate. There is no need to provide a blank region around the edge of the liquid crystal device holding driver electronics. This enables the visible picture area of the liquid crystal display to extend right to the edge of the device.

Figure 8:
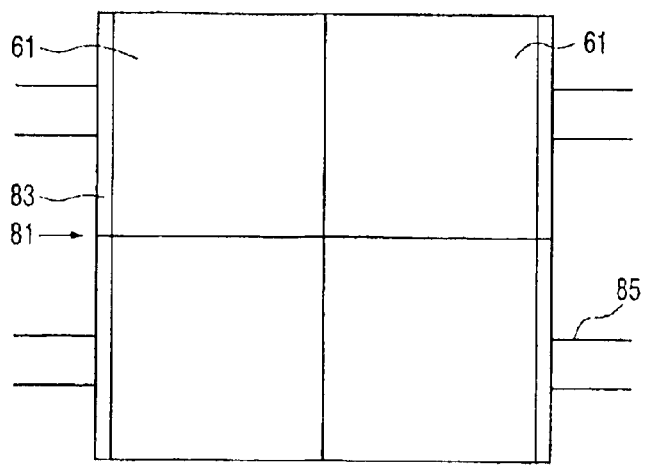
FIG. 8 shows a top view of an array of active plates used in a liquid crystal display according to the invention.

Accordingly, a number of active plates 61 may be arranged side by side to form an array 81 of plates, as illustrated in top view in FIG. 8. The array 81 is a two dimensional array extending in the same plane as the plane of the substrates 1 of the individual active plates 61. In the example illustrated, a 2×2 array is formed. A small edge region 83 includes interconnection electronics for connection to drive leads 85. The array 81 may be combined with one or more passive plates 63 sandwiching liquid crystal 61 to form a liquid crystal display in a similar manner to that illustrated in FIG. 7.

The reason that it is possible to combine the active plates 61 together is that by using the invention the area of the pixel array 19 of the active plate can extend up to very close to the edge of the plates. It is not necessary to provide large areas at the edge of the active plates 61 filled with driver circuitry.

Although the invention has been described with reference to a number of specific examples, the skilled person will realise that there are a number of alternative approaches to implementing the invention.

In particular, all of the Figures show a limited number of pixels, whereas the number of pixels in a real device may be many more.

From reading the present disclosure, other variations and modifications will be apparent to persons skilled in the art. Such variations and modifications may involve equivalent and other features which are already known in the design, manufacture and use of semiconductor devices and which may be used in addition to or instead of features described herein. Although claims have been formulated in this application to particular combinations of features, it should be understood that the scope of disclosure also includes any novel feature or any novel combination of features disclosed herein either explicitly or implicitly or any generalisation thereof, whether or not it mitigates any or all of the same technical problems as does the present invention. The applicants hereby give notice that new claims may be formulated to any such features and/or combinations of such features during the prosecution of the present application or of any further applications derived therefrom.

What is claimed is:

1. An active plate for an active matrix liquid crystal display, including a substrate;

an array of pixels, each pixel having a pixel electrode for controlling liquid crystal;

a plurality of row electrodes and column electrodes extending across the substrate in substantially orthogonal row and column directions connected to the pixels;

a sub-array of driver cells extending across the substrate between the array of pixels and the substrate, the driver cells each including at least one driver circuit for driving a row electrode or a column electrode; and an insulating layer between the sub-array of driver cells and the array of pixels, wherein each of the driver circuits in the sub-array is connected to a corresponding one of the row and column electrodes through a respective via defined in the insulating layer extending from the driver circuit to the corresponding one of the row and column electrodes.

2. Art active plate according to claim 1 wherein the vias connecting the driver circuits in the sub-array are distributed over the area of the array of pixels.

3. An active plate according to claim 1 wherein the driver cells are arranged in columns underlying a predetermined number of column electrodes, and wherein each of the column electrodes overlying a column of driver cells is connected to a column driver in a different one of the driver cells of the column of driver electrodes.

4. An active plate according to claim 1 wherein the array of pixels extends to the edge of the substrate.

5. An active plate according to claim 4 further comprising edge sealant to seal the edge of the substrate.

6. An active plate according to claim 1 wherein each driver cell of the sub-array includes a column driver.

7. An active plate according to claim 1 wherein each driver cell of the sub-array includes a row driver.

8. A reflective liquid crystal display comprising an active plate according to claim 1, a passive plate and liquid crystal between the active and passive plates.

9. A reflective liquid crystal display comprising;
   an array of active plates according to any of claim 1 arranged in a plane, the substrates of the active plates extending in the plane of the array;
   at least one passive plate spaced transversely away from the two dimensional array; and
   liquid crystal between the active and passive plates.

10. A method of making an active plate for a liquid crystal display including:
   forming a sub-array of driver cells across a substrate, the driver cells each including at least one driver for driving a row and/or a column electrode;
   depositing an insulating layer onto the sub-array of driver circuits, with said insulating layer so formed as to define a pattern of vias passing through the insulating layer, the vias being distributed over the sub-array of driver circuits;
   forming an array of pixels over the insulating layer, the array of pixels including a plurality of row electrodes and column electrodes extending across the substrate in substantially orthogonal row and column directions connected to the pixels;
   wherein each of the driver circuits in the sub-array is connected to a corresponding one of the row and column electrodes through the respective via defined in the insulating layer, and wherein the sub-array of driver cells, the insulating lever, and the array of pixels are so formed, sized, and positioned such that the sub-array of driver cells is located between the array of pixels and the insulating layer.

* * * * *